United States Patent

(10) Patent No.: US 12,535,640 B2
(45) Date of Patent: Jan. 27, 2026

Kamitsuna et al.

(54) OPTICAL FIBER TERMINATION STRUCTURE, OPTICAL CONNECTION COMPONENT AND HOLLOW-CORE OPTICAL FIBER

(71) Applicant: HAKUSAN INC., Kanazawa (JP)

(72) Inventors: Hideki Kamitsuna, Tokyo (JP); Ryo Nagase, Chiba (JP)

(73) Assignee: HAKUSAN INC., Ishikawa (JP)

( * ) Notice: Subject to any disclaimer, the term of this patent is extended or adjusted under 35 U.S.C. 154(b) by 144 days.

(21) Appl. No.: 18/023,063

(22) PCT Filed: Aug. 17, 2021

(86) PCT No.: PCT/JP2021/030075
§ 371 (c)(1),
(2) Date: Feb. 24, 2023

(87) PCT Pub. No.: WO2022/044891
PCT Pub. Date: Mar. 3, 2022

(65) Prior Publication Data
US 2023/0350135 A1 Nov. 2, 2023

(30) Foreign Application Priority Data
Aug. 25, 2020 (JP) ................................ 2020-141473

(51) Int. Cl.
*G02B 6/38* (2006.01)
(52) U.S. Cl.
CPC ................... *G02B 6/3818* (2013.01)
(58) Field of Classification Search
CPC ............ G02B 6/02304; G02B 6/02328; G02B 6/032; G02B 6/3818; G02B 6/3847; G02B 6/3849
See application file for complete search history.

(56) References Cited

U.S. PATENT DOCUMENTS 4,378,954 A * 4/1983 Baker .................. G02B 6/3843
385/80
6,012,852 A 1/2000 Kadar-Kallen et al.
(Continued)

FOREIGN PATENT DOCUMENTS

EP 0 344 478 A2 5/1989
EP 1 255 137 A2 11/2002
(Continued)

OTHER PUBLICATIONS

International Search Report and Written Opinion corresponding to International Patent Application No. PCT/JP2021/030075, dated Nov. 9, 2021.
(Continued)

*Primary Examiner* — Michael Stahl
(74) *Attorney, Agent, or Firm* — RANKIN, HILL & CLARK LLP

(57) ABSTRACT

An optical fiber termination structure including: a hollow-core optical fiber that includes a hollow portion through which light is transmitted; a light transmissive member that covers the hollow portion; and an antireflection mechanism that prevents reflection of the light passing through the light transmissive member. An example of the antireflection mechanism is a plate glass with an antireflection coating applied to both faces thereof. The thickness of the plate glass is preferably 100 μm or less. The plate glass is bonded to the end of the hollow-core optical fiber by a jig. An optical connection component is a component in which two plate glasses face each other.

19 Claims, 10 Drawing Sheets

(56) References Cited

U.S. PATENT DOCUMENTS

| | | | |
|---|---|---|---|
| 7,242,835 B2* | 7/2007 | Busse | G02B 6/262 |
| | | | 385/139 |
| 7,373,062 B2 | 5/2008 | Huber | |
| 8,854,728 B1 | 10/2014 | Brooks et al. | |
| 2002/0159734 A1 | 10/2002 | Sasaoka et al. | |
| 2002/0186915 A1* | 12/2002 | Yu | G02B 6/2746 |
| | | | 385/11 |
| 2007/0165991 A1 | 7/2007 | Huber | |
| 2009/0296098 A1* | 12/2009 | Sanders | G02B 6/4207 |
| | | | 356/461 |
| 2012/0219301 A1* | 8/2012 | Koch, III | H04B 10/25 |
| | | | 398/142 |
| 2012/0307251 A1* | 12/2012 | Sanders | G01C 19/727 |
| | | | 356/460 |
| 2015/0374207 A1 | 12/2015 | Fukuoka | |
| 2016/0282562 A1 | 9/2016 | Takamizawa et al. | |
| 2018/0372961 A1* | 12/2018 | Alkeskjold | G02B 6/02328 |
| 2019/0361171 A1 | 11/2019 | Lee | |
| 2022/0137303 A1* | 5/2022 | Otomitsu | G02B 6/3818 |
| | | | 385/78 |

FOREIGN PATENT DOCUMENTS

| | | |
|---|---|---|
| JP | 2002-323625 A | 11/2002 |
| JP | 2003-030765 A | 1/2003 |
| JP | 2006-011255 A | 1/2006 |
| JP | 2008-122838 A | 5/2008 |
| JP | 2008-151931 A | 7/2008 |
| JP | 2016-010497 A | 1/2016 |
| JP | 2016-184105 A | 10/2016 |
| JP | 2019-504350 A | 2/2019 |
| JP | 2019-504352 A | 2/2019 |
| WO | 2004/111695 A1 | 12/2004 |
| WO | 2008/072611 A1 | 6/2008 |
| WO | 2017/108060 A1 | 6/2017 |
| WO | 2017/108061 A1 | 6/2017 |

OTHER PUBLICATIONS

Nagase, et al., "Optical Connectors", NTT Technical Journal, vol. 19, No. 12, 2007, 10 pages.
Extended European Search Report dated Jan. 3, 2024 corresponding to European Patent Application No. 21861319.8.
Ryo Nagase et al., "Hollow-Core Fiber Connector," 26th Optoelectronics and Communications Conference (OECC), OSA, Jul. 3, 2021, pp. 1-3, XP034178635.

* cited by examiner

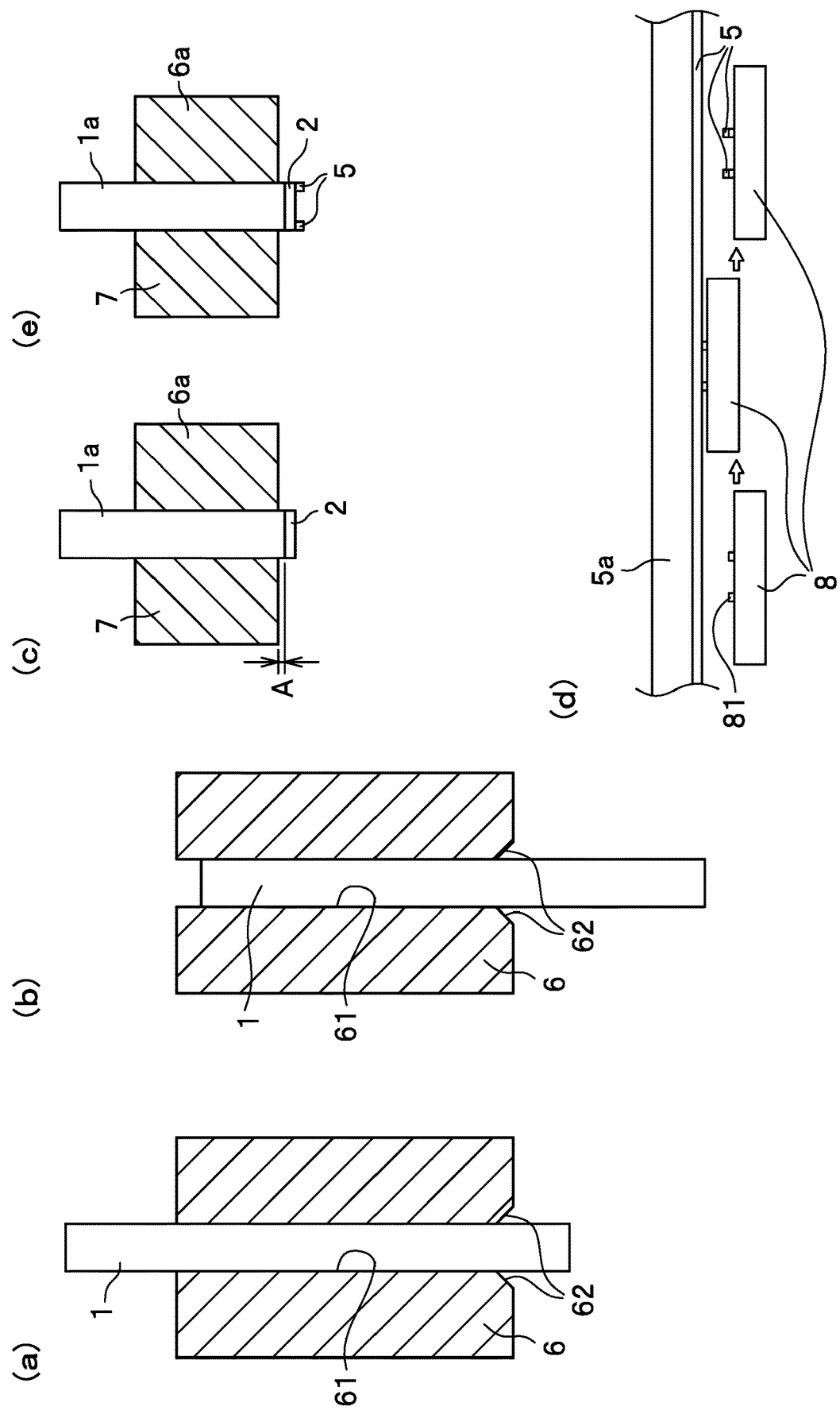

(a)

(b)

OPTICAL FIBER TERMINATION STRUCTURE, OPTICAL CONNECTION COMPONENT AND HOLLOW-CORE OPTICAL FIBER

TECHNICAL FIELD

The present invention relates to an optical fiber termination structure, an optical connection component, and a hollow-core optical fiber.

BACKGROUND ART

Optical connection components (optical connectors) that connect optical fibers, such as single core connectors including an FC connector, an SC connector, an MU connector, and an LC connector and multicore connectors including an MT connector and an MPO connector, have been developed based on a technique of putting end faces of optical fibers into physical contact with each other. A summary thereof is described in detail in Non Patent Literature 1.

In recent years, a hollow-core (hollow core) optical fiber has been focused as an optical fiber that can overcome a limitation of a conventional silica-based optical fiber (see Patent Literature 1). In this optical fiber, the core is air, and this point is a great difference from a conventional optical fiber in which the core is formed of solid glass. The hollow-core optical fiber has excellent characteristics: (1) about 1.45 times higher propagation velocity (county velocity); (2) a non-linear coefficient smaller by about triple digits; and (3) small dispersion properties. The characteristic (1) results from a smaller refractive index of the air than that of the glass and is expected to reduce delay time in an online trade and an online game. The characteristics (2) and (3) result from the fact that it is possible to significantly relax the limitation of the transmission capacity in the conventional optical fiber using glass (solid) as the core.

In the conventional optical fiber, the transmission capacity per fiber has been increased by ingenious multiplexing (wavelength multiplexing and multilevel modulation). However, no matter what method is used for multiplexing, it is impossible to reduce the total energy required for the total amount of transmission data. This means that the energy for transmission is increased as the capacity is increased.

In the conventional optical fiber with a glass core, an increase in the energy causes signal deterioration due to a non-linear optical effect of the glass and imposes the limitation of the transmission capacity, which is limitation due to fiber fuse in which a glass core portion melted by optical power concentration is propagated to an optical source side (thermal destruction limitation). In a single mode fiber with a core diameter of about 10 μm, about 1 W is the limitation, and accordingly the limitation of the transmission capacity is about 100 Tbps. Therefore, the conventional optical fiber cannot cope with an increase in network traffic that is increased in an exponential manner. This bottleneck factor is expected to be significantly solved by changing the core from solid (glass) to hollow (air). The hollow-core optical fiber is expected as an ultimate optical fiber that human beings can obtain.

However, to the hollow-core optical fiber, an optical connection technique that allows for attaching and detaching based on physical contact like the conventional glass core optical fiber (Non Patent Literature 1) is not applicable. The hollow-core optical fibers include various types such as a photonic bandgap fiber, a Kagome fiber, and an antiresonant fiber as described in Patent Literature 1; however, they all have a structure in which multiple glass inner tubes with a thin thickness (wall thickness of 1 μm or smaller) are arranged around a hollow region forming the core (see Patent Literature 1). Thus, the end portions thereof are more fragile than the end portions of the solid fiber, and there occurs a risk that, when the hollow-core optical fibers are put into physical contact with each other, the end portions are damaged to cause a fragment therefrom to enter the hollow-core portion and deteriorate the transmission characteristics. Additionally, a means for preventing a foreign matter from entering the hollow portion from the outside due to any cause other than the above cause is essential in the light of preventing deterioration in the transmission characteristics.

In order to solve this problem, there has been considered a means for protecting the hollow-core portion. For example, Patent Literatures 2 and 3 provide a means in which the hollow-core portion at a fiber end portion is filled up with a melted cladding portion or the like, thereby preventing entering of a foreign matter and achieving a strength sufficient for physical contact. However, in the above-described means, it is difficult to maintain the transmission mode of the hollow-core optical fiber, and also it is difficult to suppress reflection that occurs in a boundary between the melted glass and the air, which causes deterioration in the transmission characteristics.

As a method other than melting, there has been disclosed a termination structure in which a tip of the hollow-core optical fiber is covered with a protection element having a cavity, thereby preventing a foreign matter from entering the hollow portion (Patent Literature 4). However, with a space (the cavity) existing on a fiber end face, a gap of several millimeters to centimeters is generated between the fiber end and a window of a protection element tip to which an antireflection coating is applied. Therefore, this gap causes a problem that output light from the fiber spreads greatly and an insertion loss is increased when the fibers are optically connected through their windows.

CITATION LIST

Patent Literature

Patent Literature 1: Published Japanese Translation of PCT International Application No. 2019-504350
Patent Literature 2: JP2003-30765A
Patent Literature 3: JP2002-323625A
Patent Literature 4: U.S. Pat. No. 7,373,062B2

Non Patent Literature

Non Patent Literature 1: NTT Technical Journal, vol. 12, No. 12, 2007, pp. 74-78

SUMMARY OF INVENTION

Technical Problem

In view of the above circumstances, an object of the present invention is to improve the transmission characteristics of a hollow-core optical fiber.

Solution to Problem

To accomplish the above-described object, the present invention includes: a hollow-core optical fiber including a hollow portion through which light is transmitted; a light transmissive member that covers the hollow portion; and an antireflection mechanism that prevents reflection of the light passing through the light transmissive member.

Details are described later.

Advantageous Effects of Invention

According to the present invention, it is possible to improve the transmission characteristics of a hollow-core optical fiber.

BRIEF DESCRIPTION OF DRAWINGS

FIG. 3A is an explanatory view of an example of a bonding step (1/2).

DESCRIPTION OF EMBODIMENTS

First Embodiment

Figure 1:
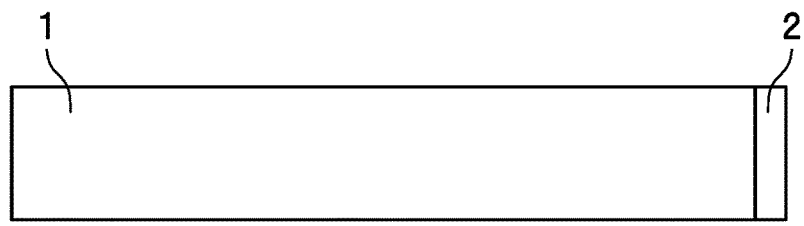
FIG. 1 is a schematic view of an optical fiber termination structure of a first embodiment.
Figure 2A:
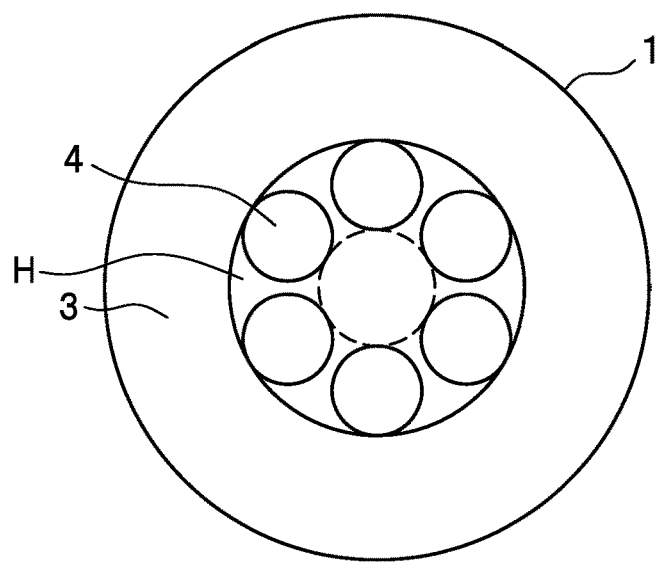
FIG. 2(a) is an end face view of a hollow-core optical fiber, and FIG. 2 (b) is a diagram in which an adhesive is applied.
Figure 2B:
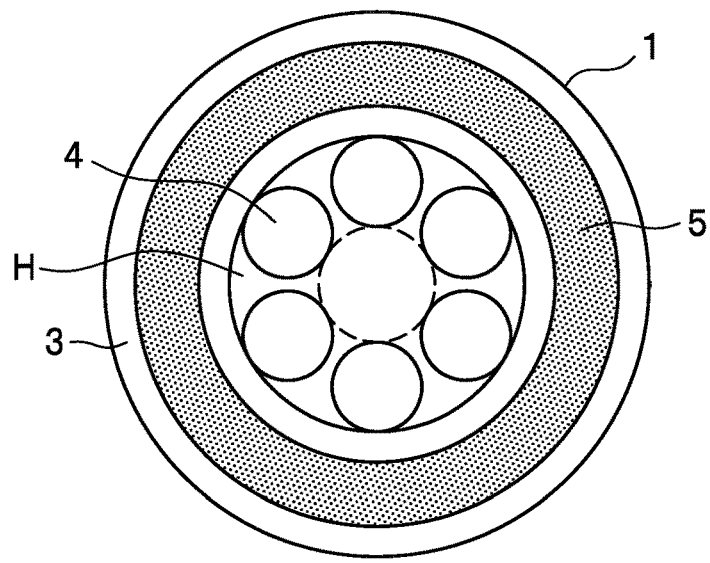

FIG. 1 shows an optical fiber termination structure of a first embodiment related to the present invention. In the optical fiber termination structure of the present embodiment, a disc-shaped plate glass 2 which has an antireflection coating (not shown) as a light transmissive member on both surfaces is bonded to an end face of a hollow-core optical fiber 1 (simply, referred to as an "optical fiber" in some cases). As shown in FIG. 2 (a), for example, the hollow-core optical fiber 1 has a structure in which six glass inner tubes 4 with a thin thickness (wall thickness of 1 μm or smaller) are arranged at an edge portion on an inner side in a radial direction of a hollow portion H covered with a tube-shaped glass 3, and a core through which light is transmitted is positioned in a region (a region indicated by a broken line circle in FIG. 2(a)) in the center in the radial direction of the hollow portion H. Hollow regions of the inner tubes 4 form the hollow portion H, and the inner tubes 4 including those hollow regions act as cladding. Note that, a jacket (not shown) may be applied to an outer side of the glass 3 as needed. An outer diameter (diameter) of the plate glass 2 is smaller than a through-hole 61 of a ferrule 6 described later and is substantially the same as an outer diameter of the hollow-core optical fiber 1.

The plate glass 2 is bonded to the end face of the hollow-core optical fiber 1. For bonding, an adhesive 5 is applied only to a portion of the glass 3 at the end portion of the hollow-core optical fiber 1 as shown in FIG. 2 (b), so that the adhesive 5 is not attached to the hollow portion H including the inner tubes 4. The plate glass 2 can cover the hollow portion H.

Figure 3B:
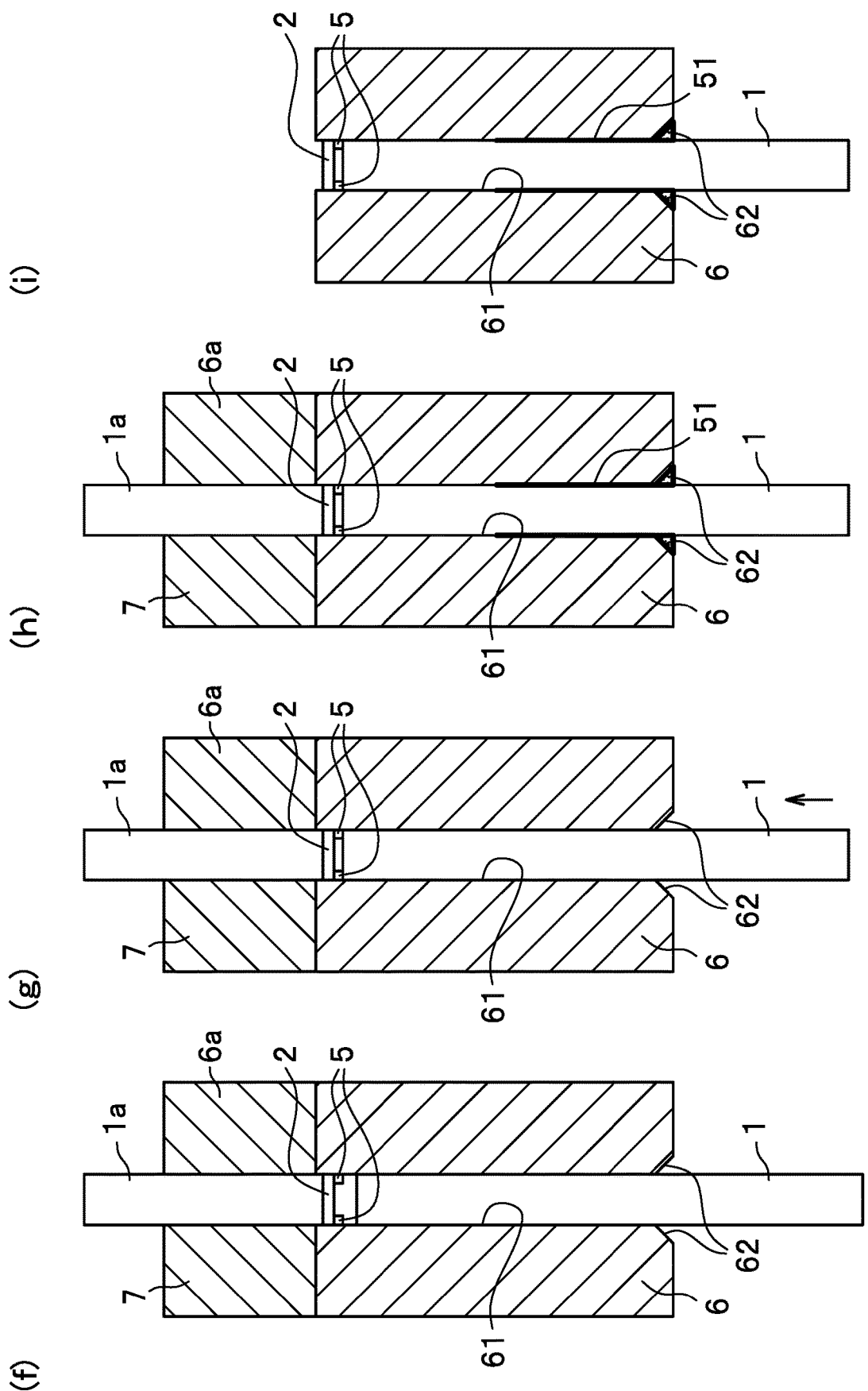
FIG. 3B is an explanatory view of the example of the bonding step (2/2).

FIGS. 3A and 3B show an example of a bonding step. After the hollow-core optical fiber 1 is inserted into the ferrule 6 including the through-hole 61 to store the hollow-core optical fiber 1 (FIG. 3A(a)), a tip of the hollow-core optical fiber 1 is cleaved and is once retracted to the inside of the ferrule 6 (FIG. 3A(b)). The material of the ferrule 6 is preferably zirconia; however, it is not limited thereto.

On the other hand, the adhesive 5 is applied to the plate glass 2. This application is performed by using an adhesive transfer jig 8 including a protrusion portion 81 that is a circular ring slightly smaller than a glass region of the hollow-core optical fiber 1 and a suction jig 7 that sucks and holds the plate glass 2. As the adhesive 5, thermosetting resin and ultraviolet curable resin are used, for example; however, it is not limited thereto. The suction jig 7 includes, for example, a ferrule 6(a) and a hollow-core optical fiber 1a (FIG. 3A(c)). Here, the hollow-core optical fiber 1a is fixed in a state where a tip thereof is exposed by an interval A from an end face of the ferrule 6(a) as shown in FIG. 3A(c). The plate glass 2 can be sucked and held with a suction pump (not shown) being included at one end of the hollow-core optical fiber 1a.

The transfer (application) of the adhesive 5 to the plate glass 2 is performed by using the adhesive transfer jig 8 (FIG. 3A(d)). The adhesive transfer jig 8 includes a protrusion portion 81 that is a circular ring slightly smaller than the glass region of the hollow-core optical fiber 1. The adhesive 5 is transferred to the protrusion portion 81 by bringing the adhesive transfer jig 8 close to the adhesive 5 applied on a plate 5(a), pressing the adhesive 5 against this protrusion portion 81, and thereafter removing the adhesive transfer jig 8 (FIG. 3A(d)).

Next, this transferred adhesive 5 is transferred to the plate glass 2 sucked and held by the suction jig 7 (FIG. 3A(e)). The plate glass 2 to which the adhesive 5 is transferred is inserted into the ferrule 6 in which the hollow-core optical fiber 1 is stored as shown in FIG. 3B(f). The adhesive 5 is cured in a state where end faces of the ferrule 6 and the ferrule 6a of the suction jig 7 are put in contact with each other and also the hollow-core optical fiber 1 is pressed in a direction of an arrow in FIG. 3B(g) to be in contact with the plate glass 2 (FIG. 3B(g)). Note that, the suction jig 7 and the adhesive transfer jig 8 can also apply or transfer the adhesive 5 to the hollow-core optical fiber 1 instead of the plate glass 2 (see FIG. 2 (b)).

When the glass 3 at the end face of the hollow-core optical fiber 1 and the plate glass 2 in the ferrule 6 are bonded together in accordance with the above-described procedure, it is possible to seal the end face of the hollow-core optical fiber 1 and make a distance from a surface out of the two surfaces of the plate glass 2 that faces the end face of the hollow-core optical fiber 1 to a sealing face of the hollow portion H (substantially the same as the end face of the hollow-core optical fiber 1) substantially zero. Thus, it is possible to reduce as much as possible the spread of output light from the hollow-core optical fiber 1 comparing with a conventional example in which a space (cavity) exists, and therefore it is possible to suppress an increase in an insertion loss of an optical connection component using the optical fiber termination structure and to improve the transmission characteristics.

Here, the optical connection component of the present embodiment is a component in which two optical fiber termination structures (a first optical fiber termination structure, a second optical fiber termination structure) are connected to each other and the plate glasses 2,2 of the optical fiber termination structures face each other. Facing of the plate glasses 2,2 can be implemented by abutting the ferrules 6,6 of the two optical fiber termination structures to each other. Note that, the optical connection component of the present embodiment can be included in a connector, and the optical connection component included in the connector can implement the abutting state of the ferrules 6,6 and can implement the transmission characteristics of light of the present invention.

Additionally, preferably, the hollow-core optical fiber 1 is bonded to the ferrule 6 by injecting an adhesive 51 from a rear end portion of the ferrule 6 in this state (FIG. 3B(h)). Specifically, first, the hollow-core optical fiber 1 is partially inserted into the through-hole 61 from the rear end portion of the ferrule 6. The insertion of the hollow-core optical fiber 1 can be easily implemented by using as a guide a chamfered portion 62 at the rear end portion of the ferrule 6 that is formed around the through-hole 61. Next, the adhesive 51 is applied to the chamfered portion 62. Next, the hollow-core optical fiber 1 is further inserted to a prescribed position. The prescribed position in the present embodiment is a position close to the plate glass 2 at which the hollow-core optical fiber 1 is close enough to be bonded to the plate glass 2. Eventually, as shown in (FIG. 3B(h)), the adhesive 51 is applied to a partial region of a side wall of the hollow-core optical fiber 1 in the through-hole 61 and is cured. Note that, at this time, the plate glass 2 is fixed at a portion retracted inward from the ferrule tip by the interval A.

The thickness of the plate glass 2 is preferably 100 µm or smaller. The reason thereof is described below. When an optical fiber is cleaved by a commercially available cleaver, a cutting angle is varied from 90 degrees, and the variation is distributed within a range of about 1 degree. When the plate glass 2 is bonded to the fiber end face in a state where the cutting angle is deviated from 90 degrees, the deviation of the cutting angle is directly linked to optical axis deviation (since there is air at two ends of the plate glass 2, the optical axis is deviated in parallel). This optical axis deviation is proportional to the thickness of the plate glass 2. A core diameter of the hollow-core optical fiber 1 is about 20 µm to 50 µm as disclosed in Patent Literature 1; for this reason, in order to form an optical connection component with a low insertion loss, this optical axis deviation needs to be generally 1 µm or smaller. When the plate glass 2 with a refractive index of 1.45 is mounted on the end face of the hollow-core optical fiber 1 with cleaved angle deviation of 1 degree, which is the worst case, if the thickness of the plate glass 2 is 100 µm, the optical axis deviation remains about 0.5 µm. Therefore, if the plate glass 2 with a thickness of 100 µm or smaller is applied, when the optical connection component is formed by abutting the ferrule end faces of the optical fiber termination structures of the present embodiment, it is possible to achieve transmission with a low insertion loss even if the manufacturing tolerance of a mechanism component and the like are taken into consideration.

The interval A is preferably 5 µm or greater and 50 µm or smaller. This interval A can be prescribed easily by the suction jig 7. In this case, when the optical connection component is formed by abutting the end faces of those ferrules 6,6, an interval between the plate glasses 2,2 (a distance between one surface of one plate glass 2 and one surface of the other plate glass 2 facing the preceding one surface) can be 10 µm or greater and 100 µm or smaller. Since the plate glasses 2,2 are out of contact with each other, it is possible to repeatedly perform stable optical connection (attaching and detaching) without considering a damage of the plate glass 2.

The reason why the interval between the plate glasses 2,2 should be 100 µm or smaller is described below. When single mode fibers with an MFD (mode field diameter) of 10 µm and an NA of 0.11 are connected to each other with a gap therebetween, if the interval is 100 µm, the insertion loss is about 0.5 dB. The hollow-core optical fiber 1 has a greater MFD and a smaller NA than those of the single mode fiber because of the structural characteristics thereof. Therefore, when the hollow-core optical fibers 1,1 are connected to each other with a gap therebetween, the insertion loss is reduced more than a case of the single mode fibers. This means that it is possible to make optical transmission with the insertion loss of 0.5 dB or smaller if the interval is set to 100 µm or smaller.

In the present embodiment, the fiber end faces are away from each other at a distance including also the thickness of the two plate glasses 2,2 (up to 200 µm). However, in a case of a route of air portion-glass portion-air portion, the spread of the light is suppressed by refraction of the glass portion. Therefore, when the optical connection component is formed by setting the interval between the plate glasses 2 as the glass portion to 100 µm or smaller, it is possible to implement the transmission with a low insertion loss. Note that, when the interval between the plate glasses 2,2 reaches a wavelength order (several micrometers or smaller), even though there is a possibility that the transmissivity is greatly varied by a slight change in the clearance, it is possible to avoid this problem by setting the interval to 10 µm or greater.

The suction jig 7 at the time of adhesive curing can be in two states: a state where the plate glass 2 is sucked; and a state where the air (gas) is pressurized to the plate glass 2. When the adhesive 5 is cured in the state of sucking, it is possible to make the surface of the plate glass 2 perpendicular to an axial direction of the ferrule 6 (an optical axis direction of the hollow-core optical fiber 1), and it is possible to output the light from the hollow-core optical fiber 1 from the ferrule 6 end face without optical axis deviation. Additionally, when the adhesive 5 is cured under pressure, it is possible to bond the end face of the hollow-core optical fiber 1 and the plate glass 2 in close contact along the cleaved face, and it is possible to perform sealing more reliably.

The interval A can be determined such that the plate glass 2 is not exposed from the end face of the ferrule 6 in an operation temperature range, taking into consideration the thermal expansion coefficients of the ferrule 6 and the hollow-core optical fiber 1. When the glass fiber is bonded to only a rear end portion of a zirconia ferrule with a length of 10 mm, if the temperature drops 50 degrees, the fiber is moved in a direction to be exposed by 8 µm due to a difference between the thermal expansion coefficients. When the above-described usage environment is assumed, if the interval A is set to about 20 µm, the plate glass 2 is not exposed from the end face of the ferrule 6 even when the environment temperature is greatly varied, and also a clearance of a wavelength order is not obtained. Thus, it is possible to provide an optical connection component that is stable under various temperature environments.

In the plate glass 2, since the antireflection coating (not shown) is applied to both surfaces, no reflection occurs between the hollow-core optical fiber 1 (air) and the plate glass 2 and an interface between the plate glass 2 and the space of the interval A at the tip portion of the ferrule 6, and it is possible to form an optical connection component with good transmission characteristics. With the above effects, it is possible to provide an optical connection component with no concern about deterioration in the transmission characteristics like the conventional solidification by melting.

Note that, the optical fiber termination structure is not limited to a mode in which the structure is housed in the ferrule 6 exemplified in FIG. 3B(i) and may be, for example, a mode from which the ferrule 6 is excluded (FIG. 1).

Second Embodiment

Figure 4:
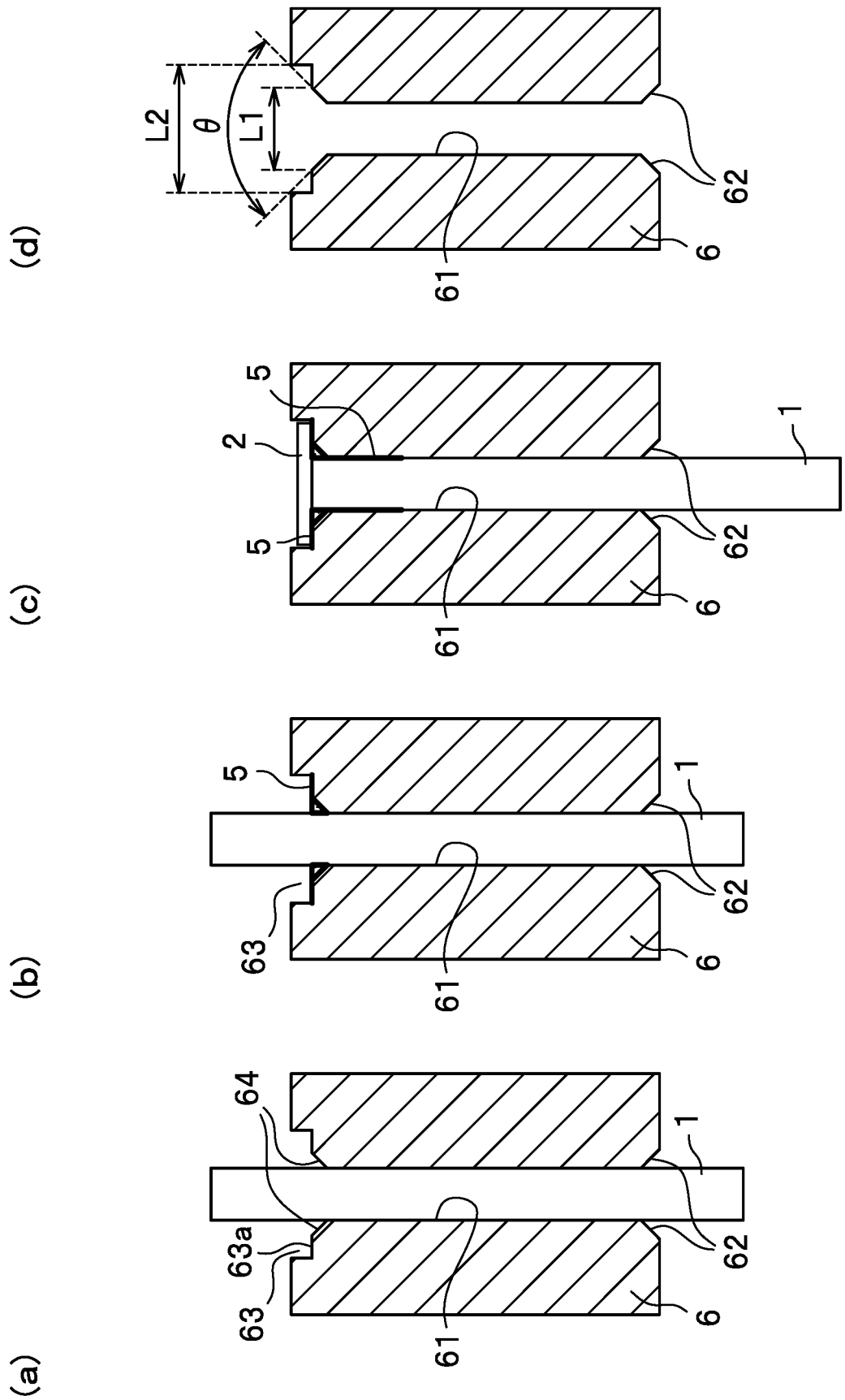
FIG. 4 is an explanatory view of a mounting step of an optical fiber termination structure of a second embodiment.

FIG. 4 shows an optical fiber termination structure of a second embodiment related to the present invention. The main difference between the present embodiment and the first embodiment is that a dent 63 to store the plate glass 2 is provided at the tip portion of the ferrule 6 to chamfer the tip portion of the ferrule 6 (a portion in which the through-hole 61 touches the dent 63). Here, the outer diameter (diameter) of the plate glass 2 is set to be greater than a chamfering range L1 and equal to or smaller than a diameter L2 of the dent 63 (see FIG. 4(*d*)). A flat portion 63*a* of the dent 63 is substantially perpendicular to the axial direction of the ferrule 6 (the optical axis direction of the hollow-core optical fiber 1). Additionally, the depth of the dent 63 is deeper than the thickness of the plate glass 2 to establish a positional relationship in which the plate glass 2 is retracted from the tip face of the ferrule 6 when bonded. This difference (the depth of the dent 63—the thickness of the plate glass 2) is preferably set to 5 μm or greater and 50 μm or smaller.

A mounting step of this embodiment is described below. After the hollow-core optical fiber 1 is inserted into the ferrule 6, the tip is cleaved (FIG. 4(*a*)), and before retracting the hollow-core optical fiber 1, the adhesive 5 is applied to the dent 63 including a chamfered portion 64, which is formed by chamfering the through-hole 61 of the ferrule 6 (FIG. 4 (*b*)). Subsequently, the plate glass 2 is pressed against the flat portion 63*a* of the dent 63 while being pressed against the end face of the hollow-core optical fiber 1 (FIG. 4 (*c*)). This step can be performed by using the suction jig 7 exemplified in FIG. 3A(c), for example. In this process, as shown in FIG. 3A(e), the adhesive 5 may be transferred to the plate glass 2 such that the plate glass 2 can be bonded to the portion of the glass 3 at the end portion of the hollow-core optical fiber 1. Meanwhile, a method of directly applying the adhesive 5 to the flat portion 63*a* of the dent 63 (existing technique) may be applied.

Note that, the outer diameter of the plate glass 2 is set to be greater than the chamfering range L1 and equal to or smaller than a diameter of the dent 63, and the plate glass 2 is locked by the flat portion 63*a* of the dent 63 when housed in the ferrule 6. In this series of procedure, when the hollow-core optical fiber 1 is retracted through the through-hole 61, the adhesive 5 applied to the chamfered portion 64 flows into the through-hole 61 along a side face of the hollow-core optical fiber 1 (FIG. 4(*c*)). With the above-described step, it is possible to simultaneously perform the bonding of the plate glass 2 to the dent 63 of the ferrule 6 and the bonding of the vicinity of the tip portion of the hollow-core optical fiber 1 to the ferrule 6 in a state where the end face of the hollow-core optical fiber 1 and the plate glass 2 are in contact with each other, and therefore it is possible to simplify the mounting step and to reduce mounting cost.

Here, since the plate glass 2 is bonded to the flat portion 63*a* of the dent 63 of the ferrule 6, the surface of the plate glass 2 has a positional relationship perpendicular to the axial direction of the ferrule 6 (the optical axis direction of the hollow-core optical fiber 1). Therefore, the optical axis is not deviated even when the cleaved angle of the hollow-core optical fiber 1 is not 90 degrees. When the cleaved angle is not 90 degrees, a small clearance occurs in an optical path between the plate glass 2 and the ferrule 6; however, since this clearance is filled with air (the amount of the adhesive 5 and the like are appropriately designed such that the adhesive 5 certainly flows into the through-hole 61), the clearance has the same refractive index as that of the core of the hollow-core optical fiber 1, and the optical axis perpendicular to the surface of the plate glass 2 is kept unchanged.

Additionally, since the hollow-core optical fiber 1 is bonded to the vicinity of the tip portion of the ferrule 6, the relative position between the hollow-core optical fiber 1 and the ferrule 6 is almost never varied even under a temperature variation. Therefore, there is no concern that disconnection of micrometer order may occur due to excessive pressurization onto the plate glass 2 in contact with the end face of the hollow-core optical fiber 1 and lead-in of the fiber.

However, there occurs a positional variation of several tens nanometer order in the axial direction due to a pistoning phenomenon caused by a difference of the thermal expansion coefficients between glass and zirconia. This positional variation is directly transferred to the plate glass 2 in contact with the end face of the hollow-core optical fiber 1, and also gives a concern that breakage may occur as the worst case.

This concern can be solved by the chamfered portion 64 provided on the ferrule 6. This is because the adhesive 5 or the space with a lower hardness than that of zirconia exists in the chamfered portion 64 in the optical fiber termination structure of the present embodiment. Even when a pressure caused by the pistoning is applied to the plate glass 2 and the position of the plate glass 2 is moved in the axial direction of the fiber (a vertical direction in FIG. 4), this stress can be relaxed by the existence of this adhesive 5 or space, and thus it is possible to avoid a damage of the plate glass 2. This stress relaxation is more effective as an area of the chamfered portion 64 is larger. For example, when a radius of the hollow-core optical fiber 1 is a, it is possible to achieve sufficient stress relaxation by chamfering at Ca (chamfering obliquely at a position of a from a tip of a corner) and Ra (chamfering circularly with the radius a) or greater, or by setting an apex angle θ of the chamfering to 90 degrees or greater (see FIG. 4 (*d*)).

Now, in the chamfered portion 64, the hollow-core optical fiber 1 is exposed from the through-hole 61, and this exposing length is desirably short in terms of the optical axis deviation suppression. On the other hand, in terms of the stress relaxation, the bonding area between the plate glass 2 and the adhesive 5 is desirably large. If the apex angle θ of the chamfering is set to 90 degrees or greater, it is possible to achieve both the securing of the bonding area between the plate glass 2 and the adhesive 5 and the reducing of the exposing length of the hollow-core optical fiber 1 from the through-hole 61.

With the above, comparing with the conventional example, it is possible to minimize the interval between the hollow-core optical fiber 1 and the plate glass 2, and therefore it is possible to reduce the spread of the output light from the hollow-core optical fiber 1 as much as possible and also to implement an optical fiber termination structure with no optical axis deviation.

Additionally, since the plate glass 2 is arranged in the portion retracted from the end face of the ferrule 6 by 5 µm or greater and 50 µm or smaller, when the optical connection component is formed by abutting the end faces of the ferrules 6,6, it is possible to avoid contact between the plate glasses 2,2 over a wide temperature range and also to set the interval therebetween to 10 µm or greater and 100 µm or smaller, and it is possible to provide an optical connection component with a low insertion loss. Note that, since the antireflection coating is applied to both surfaces of the plate glass 2, no reflection occurs between the hollow-core optical fiber 1 (air) and the plate glass 2 and the interface between the plate glass 2 and the space at the tip portion of the ferrule 6, and it is possible to form an optical connection component with good transmission characteristics. With the above effects, it is possible to provide an optical connection component with no concern about deterioration in the transmission characteristics like the conventional solidification by melting.

Note that, the hollow-core optical fiber 1 may be bonded to the rear end portion of the ferrule 6 by injecting the adhesive 51 from the rear end portion of the ferrule 6 (see FIG. 3B(h)). In this way, it is possible to make the adhesion strength of the hollow-core optical fiber 1 to the ferrule 6 more rigid.

First Modification of Second Embodiment

Figure 5:
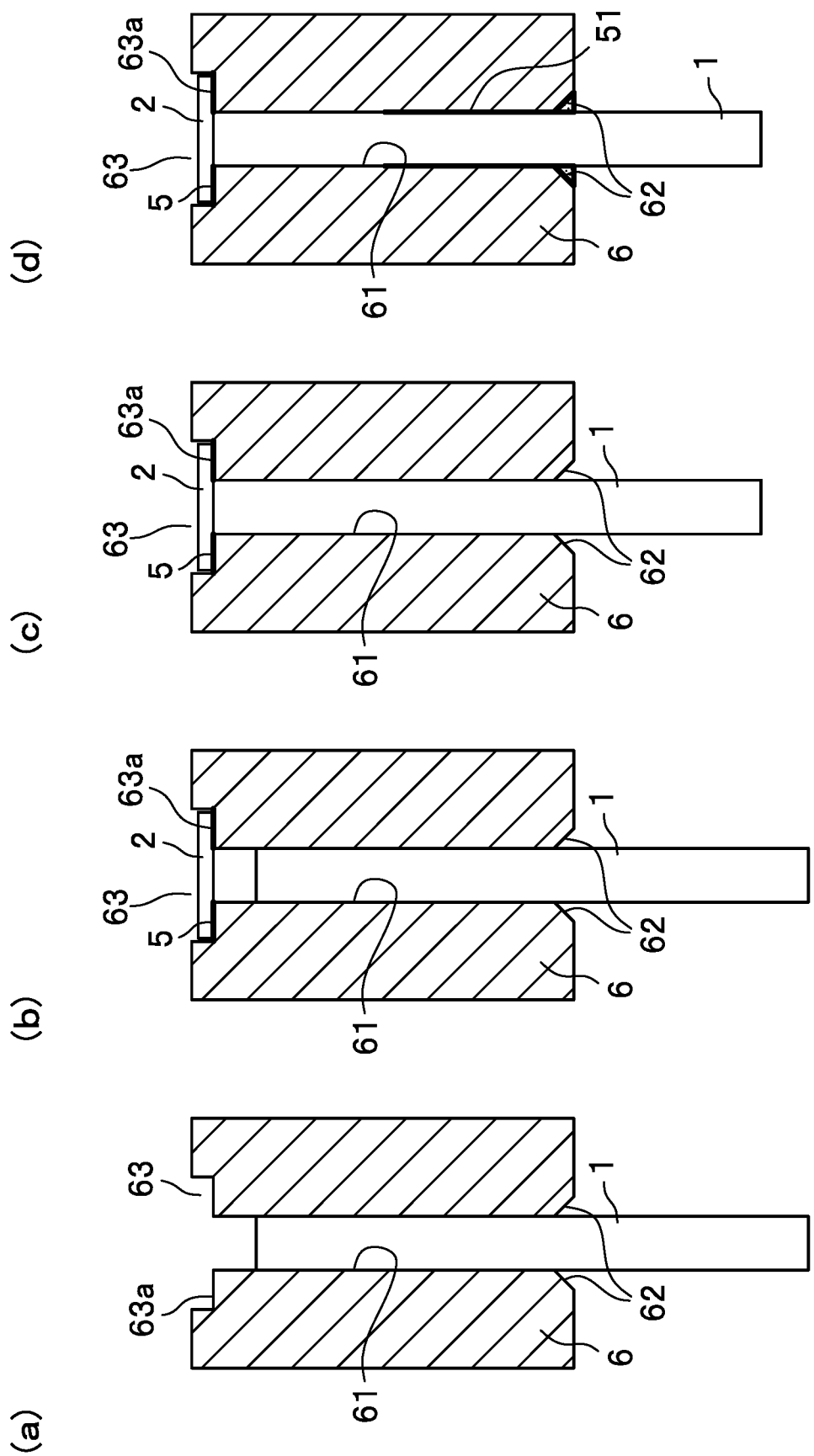
FIG. 5 is an explanatory view of a mounting step of the optical fiber termination structure of a first modification of the second embodiment.

FIG. 5 shows an optical fiber termination structure of a first modification of the second embodiment related to the present invention. The main difference between the present embodiment and the embodiment shown in FIG. 4 is that there is no chamfered portion 64 of the ferrule 6. Providing no chamfered portion 64 has an advantage that an inexpensive ferrule can be used. The outer diameter of the plate glass 2 is set to be greater than the through-hole 61 of the ferrule 6 and equal to or smaller than the diameter of the dent 63. Additionally, the depth of the dent 63 is deeper than the thickness of the plate glass 2 to establish a positional relationship in which the plate glass 2 is retracted from the tip face of the ferrule 6 when bonded. This difference (the depth of the dent 63—the thickness of the plate glass 2) is preferably set to 5 µm or greater and 50 µm or smaller.

A mounting step of this embodiment is described below. The cleaved hollow-core optical fiber 1 is retracted into the through-hole 61 of the ferrule 6 (FIG. 5(a)). In this state, the plate glass 2 is pressed against and bonded to the flat portion 63a of the dent 63 of the ferrule 6 (FIG. 5 (b)). As shown in FIG. 3A, this bonding can be performed by the method of transferring the adhesive to the portion of the plate glass 2 to be in contact with the flat portion 63a of the dent 63 or the method of directly applying the adhesive to the flat portion 63a of the dent 63 (existing technique).

After the bonding, the hollow-core optical fiber 1 in the ferrule 6 is raised to a predetermined position (FIG. 5(c)). This predetermined position is a position away at a predetermined distance from the plate glass 2. For example, the tip of the hollow-core optical fiber 1 can be maintained at the predetermined position by providing a camera (not shown) on an upper side of FIG. 5 (on the opposite side of the ferrule 6 in the plate glass 2) and monitoring the through-hole 61 of the ferrule 6 through the plate glass 2. The bonding is performed by injecting the adhesive 51 from the rear end portion of the ferrule 6 in this state (FIG. 5(d)) (see FIG. 3B(h)).

Note that, this predetermined interval is preferably set to about 10 µm. This takes into consideration the movement of the fiber in a direction of being exposed by 8 µm due to a difference between the thermal expansion coefficients if the temperature drops 50 degrees when the glass fiber is bonded to only the rear end portion of the zirconia ferrule with a length of 10 mm. Therefore, with the setting of the interval to about 10 µm, the tip of the hollow-core optical fiber 1 is kept out of contact with the plate glass 2 even when the environment temperature is varied greatly.

Thus, since it is possible to minimize the interval between the hollow-core optical fiber 1 and the plate glass 2 with no concern about a damage of the plate glass 2, it is possible to implement an optical fiber termination structure that suppresses the spread of the light. Additionally, since the plate glass 2 is bonded to the dent 63 of the ferrule 6, the surface of the plate glass 2 has a perpendicular positional relationship with respect to the axial direction of the ferrule 6 (the optical axis direction of the hollow-core optical fiber 1). Therefore, the optical axis is not deviated even when the cleaved angle of the hollow-core optical fiber 1 is not 90 degrees. When the cleaved angle is not 90 degrees, a small clearance occurs in an optical path between the plate glass 2 and the ferrule 6; however, since this clearance is filled with air (the amount of the adhesive 5 and the like are appropriately designed such that the adhesive 5 certainly flows into the through-hole 61), the clearance has the same refractive index as that of the core of the hollow-core optical fiber 1, and the optical axis perpendicular to the surface of the plate glass 2 is kept unchanged.

With the above, comparing with the conventional example, it is possible to reduce the spread of the output light from the hollow-core optical fiber 1 as much as possible by minimizing the interval between the hollow-core optical fiber 1 and the plate glass 2 and also to implement an optical fiber termination structure with no optical axis deviation.

Since the tip of the plate glass 2 has a positional relationship of being retracted from the end face of the ferrule 6 by 5 µm or greater and 50 µm or smaller, when the optical connection component is formed by abutting the end faces of the ferrules 6, it is possible to avoid contact between the plate glasses 2 and also to set the interval therebetween to 10 µm or greater and 100 µm or smaller. Therefore, it is possible to suppress the spread of the light with no concern about a damage of the plate glass 2 and to repeatedly make a stable optical connection (attaching and detaching) with a low insertion loss. Note that, since the antireflection coating is applied to both surfaces of the plate glass 2, no reflection occurs between the hollow-core optical fiber 1 (air) and the plate glass 2 and the interface between the plate glass 2 and the space at the tip portion of the ferrule 6. Thus, it is possible to provide an optical connection component with no concern about deterioration in the transmission characteristics like the conventional solidification by melting.

Second Modification of Second Embodiment

Figure 6:
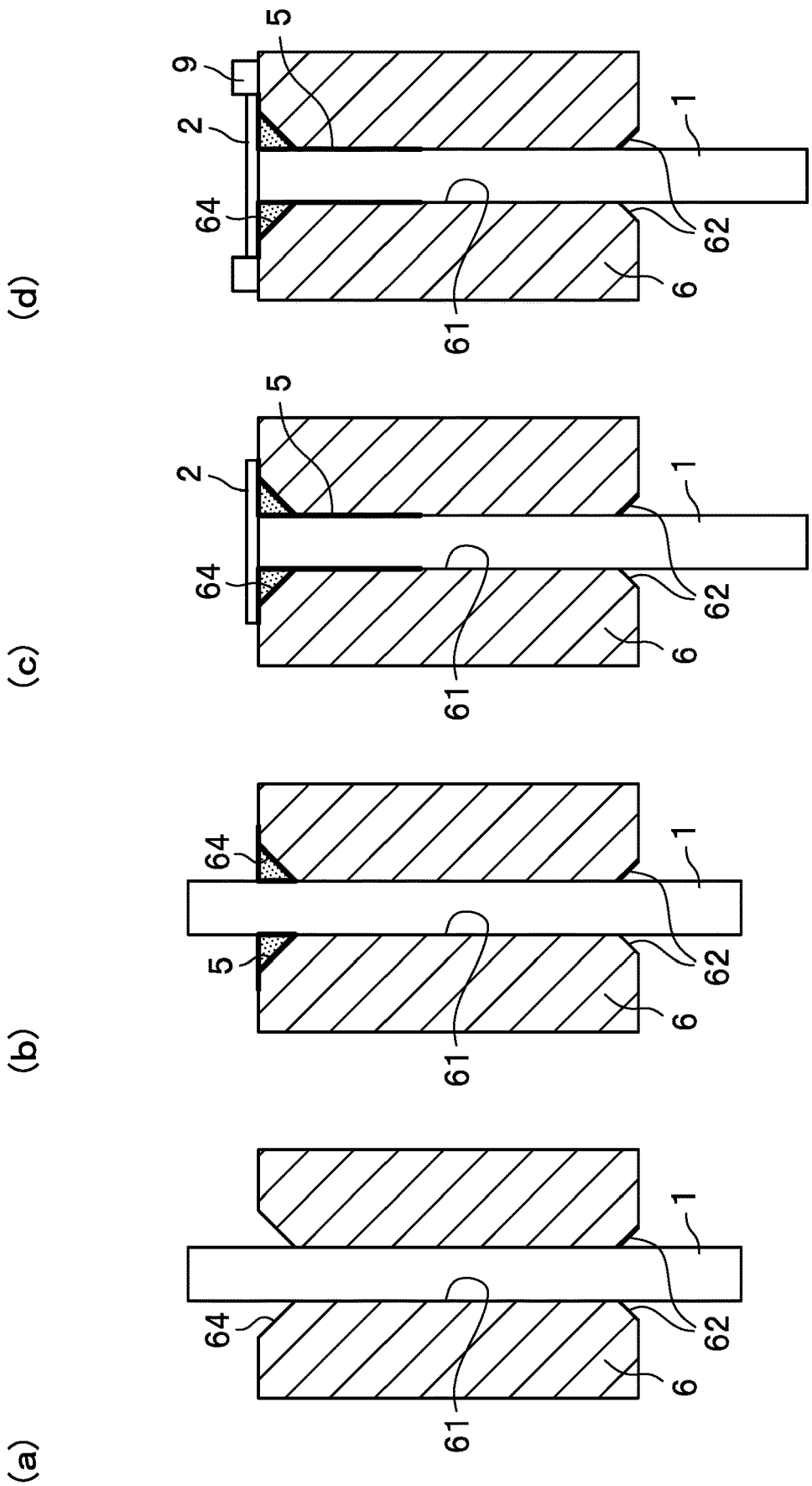
FIG. 6 is an explanatory view of a mounting step of the optical fiber termination structure of a second modification of the second embodiment.

FIG. 6 shows an optical fiber termination structure of a second modification of the second embodiment related to the present invention. The main difference between the present embodiment and the embodiment shown in FIG. 4 is that there is no dent 63 in the ferrule 6. Therefore, the chamfered portion 64 formed by chamfering the through-hole 61 of the ferrule 6 is formed at the end face of the ferrule 6. Providing no dent 63 has an advantage that an inexpensive ferrule can be used. The outer diameter of the plate glass 2 is set to be greater than the chamfering range L1 (see FIG. 4(*d*)) and smaller than the outer diameter of the ferrule 6.

A mounting step of this embodiment is described below. After the hollow-core optical fiber 1 is inserted into the ferrule 6, the tip is cleaved (FIG. 6(*a*)), and before retracting the hollow-core optical fiber 1, the adhesive 5 is applied to the chamfered portion 64 (FIG. 6(*b*)). Subsequently, the plate glass 2 is put into contact with the end face of the ferrule 6 while being pressed against the end face of the hollow-core optical fiber 1 (FIG. 6(*c*)). Here, as shown in FIG. 3A, the application of the adhesive 5 to the chamfered portion 64 can be performed by the method of transferring the adhesive 5 to the portion of the plate glass 2 to be in contact with the ferrule 6 or the method of directly applying the adhesive to the chamfered portion 64 of the end face of the ferrule 6 (existing technique).

In this series of procedure, when the hollow-core optical fiber 1 is retracted through the through-hole 61, the adhesive 5 applied to the chamfered portion 64 flows into the through-hole 61 along the side face of the hollow-core optical fiber 1 (FIG. 6(*c*)). With the above-described step, it is possible to simultaneously perform the bonding of the plate glass 2 to the end face of the ferrule 6 and the bonding of the vicinity of the tip portion of the hollow-core optical fiber 1 to the ferrule 6 in a state where the end face of the hollow-core optical fiber 1 and the plate glass 2 are in contact with each other, and therefore it is possible to simplify the mounting step and to reduce mounting cost.

Here, since the plate glass 2 is bonded to the end face of the ferrule 6, the surface of the plate glass 2 has a positional relationship perpendicular to the axial direction of the ferrule 6 (the optical axis direction of the hollow-core optical fiber 1). Therefore, the optical axis is not deviated even when the cleaved angle of the hollow-core optical fiber 1 is not 90 degrees. When the cleaved angle is not 90 degrees, a small clearance occurs in an optical path between the plate glass 2 and the ferrule 6; however, since this clearance is filled with air (the amount of the adhesive 5 and the like are appropriately designed such that the adhesive 5 certainly flows into the through-hole 61), the clearance has the same refractive index as that of the core of the hollow-core optical fiber 1, and the optical axis perpendicular to the surface of the plate glass 2 is kept unchanged.

Additionally, since the hollow-core optical fiber 1 is bonded to the tip portion of the ferrule 6, the relative position between the hollow-core optical fiber 1 and the ferrule 6 is almost never varied even under a temperature variation. Therefore, there is no concern that disconnection of micrometer order may occur due to excessive pressurization onto the plate glass 2 in contact with the end face of the hollow-core optical fiber 1 and lead-in of the fiber.

However, there occurs a positional variation of several tens nanometer order in the axial direction due to the pistoning phenomenon caused by a difference of the thermal expansion coefficients between glass and zirconia. This positional variation is directly transferred to the plate glass 2 in contact with the end face of the hollow-core optical fiber 1, and also gives a concern that breakage may occur as the worst case.

This concern can be solved by the existence of the chamfered portion 64 provided on the ferrule 6. This is because the adhesive 5 or the space with a lower hardness than that of zirconia exists in the chamfered portion 64 in the optical fiber termination structure of the present embodiment. Even when the pressure caused by the pistoning is applied to the plate glass 2 and the position of the plate glass 2 is moved in the axial direction of the fiber (a vertical direction in FIG. 6), this stress can be relaxed by the existence of this adhesive 5 or space, and thus it is possible to avoid a damage of the plate glass 2. This stress relaxation is more effective as the area of the chamfered portion is larger.

For example, when the radius of the hollow-core optical fiber 1 is a, it is possible to achieve sufficient stress relaxation by chamfering at Ca and Ra or greater, or by setting the apex angle θ of the chamfering to 90 degrees or greater (see FIG. 4 (*d*)). If the apex angle θ of the chamfering is set to 90 degrees or greater, it is possible to achieve both the securing of the bonding area between the plate glass 2 and the adhesive 5 and the reducing of the exposing length of the hollow-core optical fiber 1 from the through-hole 61.

With the above, comparing with the conventional example, it is possible to reduce the spread of the output light from the hollow-core optical fiber 1 as much as possible by minimizing the interval between the hollow-core optical fiber 1 and the plate glass 2 and also to implement an optical fiber termination structure with no optical axis deviation.

The optical connection component that connects those optical fiber termination structures includes a spacer 9 as shown in FIG. 6(*d*). This spacer 9 preferably has a shape in a ring form, and an inner diameter thereof is set to be greater than the outer diameter of the plate glass 2 while an outer diameter thereof is set to be equal to or smaller than the outer diameter of the ferrule 6. Additionally, the thickness of the spacer 9 is greater than the thickness of the plate glass 2. Preferably, the thickness of the spacer 9 is thicker by 5 μm or greater and 50 μm or smaller than the thickness of the plate glass 2. Note that, the configuration including this spacer 9 can be used as the optical fiber termination structure.

Here, the optical connection component of the present embodiment is a component in which the two optical fiber termination structures including the spacer 9 are connected to each other and the plate glasses 2,2 of the optical fiber termination structures face each other. Note that, the spacer 9 can surround the plate glass 2 bonded to the end face of the ferrule 6. Additionally, the spacer 9 can be appropriately bonded to the end face of the ferrule 6 (not shown in FIG. 6(*d*)).

With the above-described spacer 9 provided between the end faces of the optical fiber termination structures shown in FIG. 6, when the optical connection component is formed with the end faces of the ferrules 6,6 facing each other across the spacer 9, it is possible to avoid contact between the plate glasses 2,2 and also to set the interval therebetween to 10 μm or greater and 100 μm or smaller. Therefore, in the connection between the optical fiber termination structures with no optical axis deviation, it is possible to suppress the spread of the light with no concern about a damage of the plate glass 2, and it is possible to repeatedly perform stable optical connection (attaching and detaching) with a low insertion loss.

Note that, since the antireflection coating is applied to both surfaces of the plate glass 2, no reflection occurs at the interfaces between the hollow-core optical fiber 1 (air) and the plate glass 2 and between the plate glass 2 and the space at the tip portion of the ferrule 6, and it is possible to form an optical connection component with good transmission characteristics. Thus, it is possible to provide an optical connection component with no concern about deterioration in the transmission characteristics like the conventional solidification through melting.

Note that, it is not limited to the optical fiber termination structure of the embodiment exemplified in FIG. 6, and a form including no chamfered portion 64 in the ferrule 6 may be used. In this case, there is an advantage that a more inexpensive ferrule can be used. In this case, like the embodiment exemplified in FIG. 5, preferably, the hollow-core optical fiber 1 and the plate glass 2 are put out of contact with each other and bonded with a predetermined spacing such that the hollow-core optical fiber 1 and the plate glass 2 are kept out of contact with each other even under a temperature variation.

Additionally, the spacer 9 does not need to be included in each optical fiber termination structure, and just one spacer 9 may be provided in one optical connection component. In this case, the thickness of the spacer 9 is preferably more than twice as large as the thickness of the plate glass 2 (a thickness total value of the two plate glasses 2) by 10 μm or greater to 100 μm or smaller. The optical connection component of the present embodiment is a component in which the two optical fiber termination structures (the first optical fiber termination structure including the spacer 9, the second optical fiber termination structure including no spacer 9) are connected to each other and the plate glasses 2,2 of the optical fiber termination structures face each other. Note that, the spacer 9 can surround the plate glass 2 bonded to the end face of the ferrule 6. Additionally, the spacer 9 can be appropriately bonded to the end face of the ferrule 6.

[Another Modification]

Figure 7:
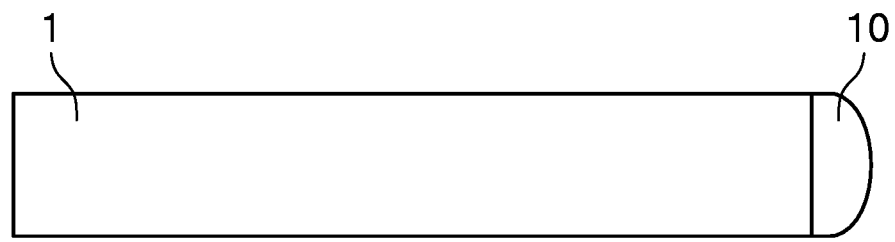
FIG. 7 is another example of a light transmissive member.
Figure 7:
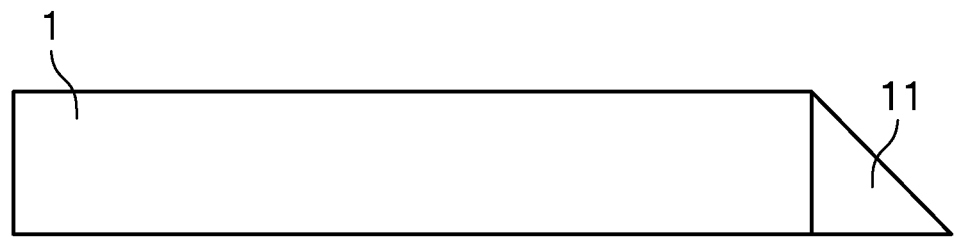

(a) In the above embodiments, the plate glass 2 is used as the light transmissive member; however, it is not limited thereto as long as it is a material through which light is transmitted and may be Si or resin. The shape of the light transmissive member is not necessarily a disc and may be another shape such as rectangular. Additionally, as shown in FIG. 7, it may be a shape having a function such as a flat convex lens 10 or a prism 11. When the flat convex lens 10 or the prism 11 is applied, it is possible to provide a degree of freedom in a connection distance and a connection direction; for this reason, it is possible to achieve diversification of the optical connection component configuration.

(b) As the hollow-core optical fiber, it is not limited to that exemplified in FIG. 2(a) and may be in various types such as a photonic bandgap fiber, a Kagome fiber, an antiresonant fiber, and an NANF as long as the core is hollow.

(c) The material of the ferrule 6 is not limited to zirconia and may be another material such as resin, glass, and metal.

(d) In the present embodiment, the optical fiber termination structure using the ferrule 6 is exemplified; however, the present embodiment can also be applied to another type such as a V groove array (an optical fiber termination structure with no ferrule).

Figure 8A:
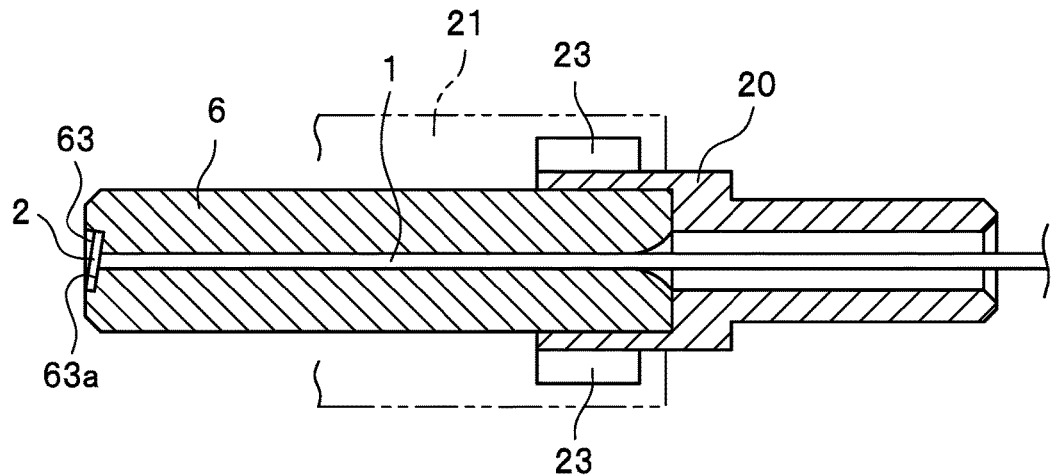
FIG. 8(a) is a schematic view of an optical fiber termination structure of another modification.
Figure 10:
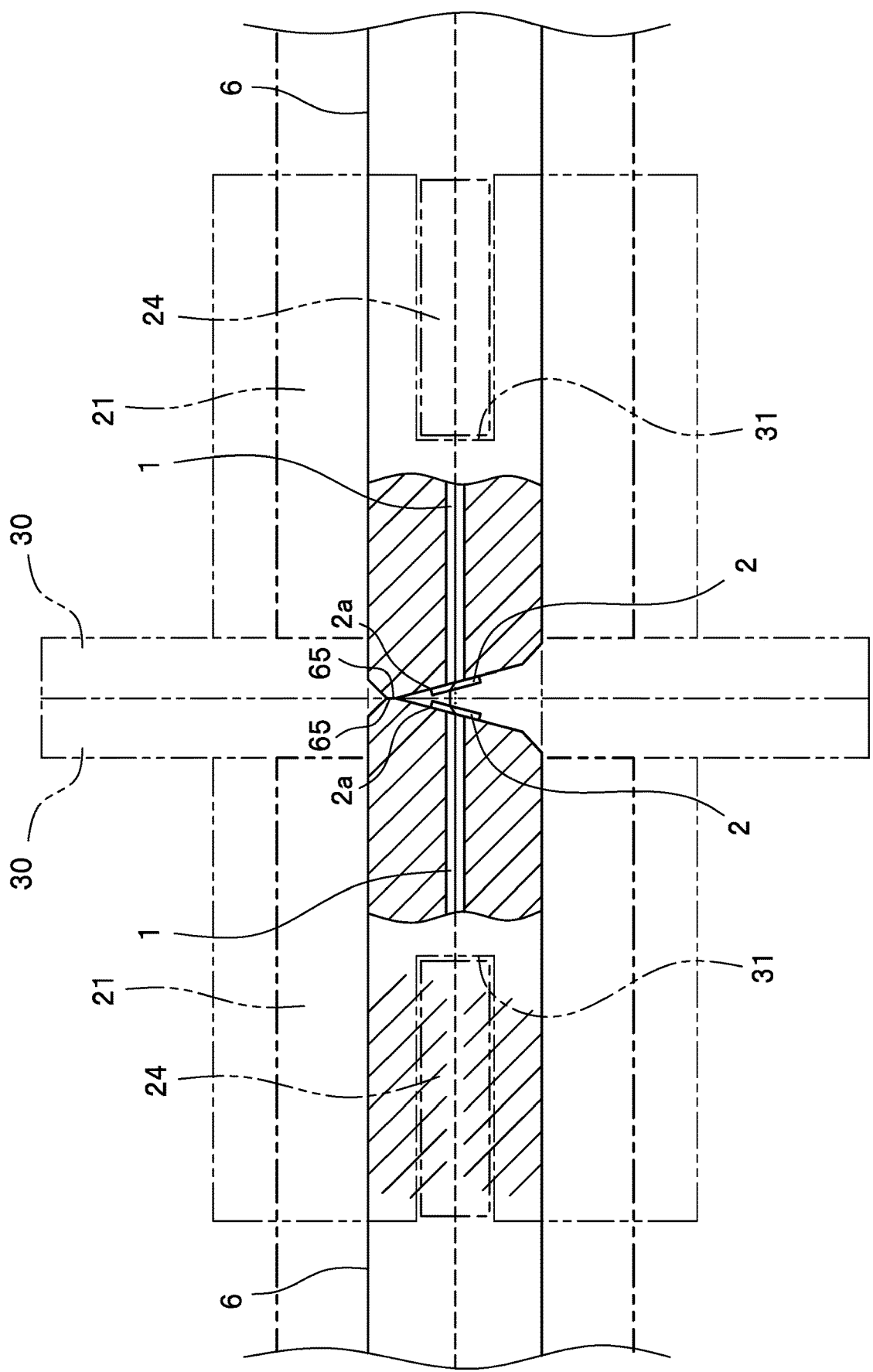
FIG. 10 is a schematic view of the optical connection component using the optical fiber termination structure of the other modification (2/2).

(e) A type in which the end face and the dent 63 of the ferrule 6 as the face to be bonded to the plate glass 2 is perpendicular to the axial direction of the ferrule 6 (the optical axis direction of the hollow-core optical fiber 1) (a type in which the optical axis direction of the hollow-core optical fiber 1 coincides with a normal direction of the end face and a flat face in the dent 63 of the ferrule 6) is exemplified; however, for example, the end face and the dent 63 of the ferrule 6 does not have to be perpendicular, and may be inclined at an arbitrary (predetermined) angle (preferably, 8 degrees or smaller) with respect to the axial direction of the ferrule 6. In other words, the normal direction of the end face and the flat face in the dent 63 of the ferrule 6 may be inclined to the axial direction of the ferrule 6. FIG. 8(a) exemplifies an optical fiber termination structure in which the flat portion 63a of the dent 63 formed at the ferrule 6 end face is inclined. In this case, it is possible to implement a predetermined reflection attenuation (for example, 40 dB) with good reproducibility without applying the antireflection coating with extremely low reflection to the plate glass 2 since the reflection angle of returning light from the plate glass 2 is increased according to the inclination angle of the flat portion 63a of the dent 63. Since the glass including the antireflection coating with extremely low reflection is unnecessary, there is an advantage that a more inexpensive component can be applied. Additionally, in the configuration in which the plate glass 2 includes the antireflection coating with extremely low reflection, a wavelength band that can implement the extremely low reflection is limited due to material selection of the antireflection coating and the like. On the other hand, in the configuration in which the flat portion 63a of the dent 63 is inclined and the plate glass 2 includes no antireflection coating with extremely low reflection, there is an advantage that the good characteristics of the extremely low reflection can be obtained over a wide wavelength band. Note that, although it is not the extremely low reflection, it is possible to reduce the connection loss due to Fresnel reflection by inclining the plate glass 2 to which the antireflection coating is applied. The antireflection coating applied to the two surfaces of the plate glass 2 described in the present embodiment and the inclination of (the flat portion 63a) of the dent 63 and also the inclination of the end face of the ferrule 6 shown in FIG. 10 are specific examples of an antireflection mechanism that prevents reflection of the light passing through the plate glass 2.

Figure 8B:
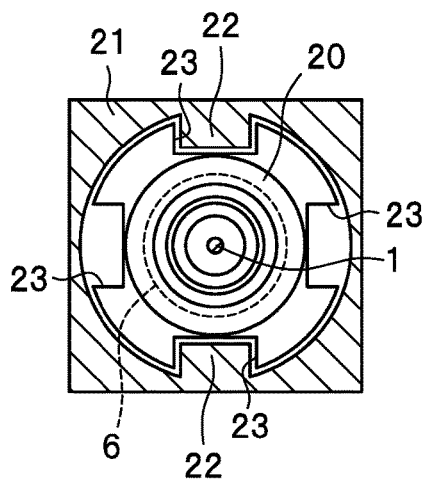
FIG. 8(b) is a diagram viewing the optical fiber termination structure in FIG. 8(a) from the right.
Figure 9:
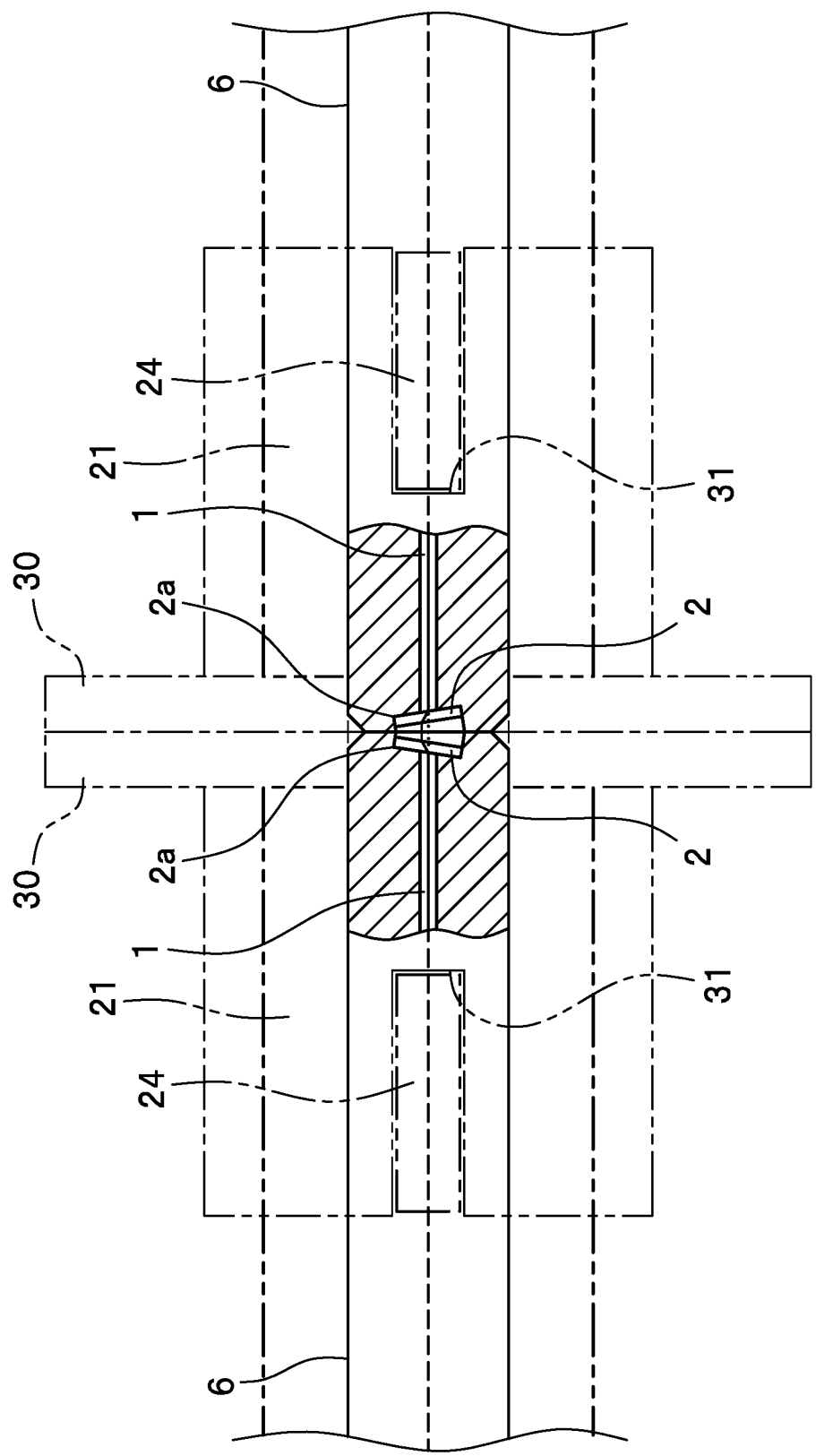
FIG. 9 is a schematic view of an optical connection component using the optical fiber termination structure of the other modification (1/2).

A preferable example of the optical connection component in which the optical fiber termination structures face each other, whish is shown in FIGS. 8(a) and 8(b), is shown in FIG. 9 and described. The optical fiber termination structure includes the ferrule 6 to store the hollow-core optical fiber 1, a flange 20 into which the ferrule 6 is press-fitted, and a housing 21 to store the flange 20. The present optical connection component is formed by connecting the optical fiber termination structures facing each other with an adaptor 30 arranged therebetween.

When the flange 20 is stored into the housing 21, a key groove 22 of the housing 21 is fitted to a projection portion 23 of the flange 20, and thus relative rotation angles of the flange 20 and the housing 21 are determined uniquely. Here, when the ferrule 6 is press-fitted into the flange 20, for example, the shallowest portion of the inclined flat portion 63a of the dent 63 is fitted to the key groove 22 of the housing 21. That is, relative rotation angles of the ferrule 6 and the housing 21 are determined. Additionally, when the optical connection component is formed by facing the optical fiber termination structures each other, the projection portions 23,23 of the flanges 20,20 face each other by fitting keys 24,24 of the housings 21,21 to the key grooves 31,31 of the adaptors 30. As a result, as shown in FIG. 9, it is possible to form the optical connection component in which the shallowest portions of the flat portions 63a of the dents 63 face each other and inclination apex portions 2a of the plate glass 2 arranged in the flat portion 63a (a portion arranged in the shallowest portion of the flat portion 63a of the dent 63 in the plate glass 2) face each other (including meaning of substantially facing each other), respectively.

When the inclination of the flat portion 63a of the dent 63 is 8 degrees and the thickness of the plate glass 2 is 100 μm, an offset of the optical axis in the plate glass 2 is as large as about 4 μm; however, when the inclination apex portions 2a of the plate glasses 2 arranged in the corresponding flat portions 63a,63a face each other as shown in FIG. 9, no optical axis deviation as the optical connection component occurs. When the optical connection component is formed by facing the optical fiber termination structures in which the inclination angles of the end faces of the ferrules 6 and the flat portions 63a of the dents 63 are the same, no optical axis deviation occurs even when the inclination angle is an arbitrary angle (even when greater than 8 degrees). Therefore, it is possible to implement a predetermined reflection attenuation with good reproducibility by providing predetermined inclination to the plate glass 2, and also it is possible to form the optical connection component with a small insertion loss.

Note that, the above descriptions also apply to the configuration shown in FIG. 10 in which the end faces of the ferrules 6,6 are inclined with respect to the axial direction of the ferrules 6,6. As shown in FIG. 10, although most of the regions of the end faces of the ferrules 6,6 are inclined, partial regions 65,65 shifted from the central axes of the ferrules 6,6 outward in the radial direction by a predetermined amount are not inclined and serve as contact faces in forming the optical connection component with the optical fiber termination structures facing to each other. The plate thickness and the diameter of the plate glasses 2,2 and the region of the inclined portion of the ferrules 6,6 end faces are determined such that the plate glasses 2,2 on the end faces of the ferrules 6,6 are kept out of contact with each other when the optical connection component is formed at a predetermined inclination angle.

Additionally, the above descriptions also apply to a type in which the hollow-core optical fiber 1 is obliquely cleaved in the type of bonding the plate glass 2 to the hollow-core optical fiber 1 shown in FIG. 1.

(f) Additionally, it is also possible to implement a technique that is an appropriate combination of the various techniques described in the present embodiment.

(g) Moreover, it is possible to appropriately change shapes, materials, functions, and the like of the constituents of the present invention without departing from the intent of the present invention.

REFERENCE SIGNS LIST

1,1a hollow-core optical fiber
2 plate glass (light transmissive member)
3 glass
4 inner tube
5,51 adhesive
5(a) plate
6,6 (a) ferrule
61 through-hole
62 chamfered portion
63 dent
63a flat portion
64 chamfered portion
65 partial region (of inclined end face of ferrule)
7 suction jig (jig)
8 adhesive transfer jig (jig)
81 protrusion portion
9 spacer
10 flat convex lens
11 prism
20 flange
21 housing
22 key groove
23 projection portion
24 key
30 adaptor
H hollow portion

The invention claimed is:

1. An optical fiber termination structure comprising:
a hollow-core optical fiber that includes a hollow portion through which light is transmitted;
a light transmissive member that covers the hollow portion;
a dent to store the light transmissive member at an end face of a ferrule into which the hollow-core optical fiber is inserted; and
a chamfered portion formed by chamfering a through-hole of the ferrule, wherein
the light transmissive member is bonded to a flat portion of the dent, and
an outer diameter of the light transmissive member is greater than a chamfering range of the chamfered portion.

2. The optical fiber termination structure, according to claim 1, wherein a thickness of the light transmissive member is 100 µm or smaller.

3. The optical fiber termination structure, according to claim 1, wherein the light transmissive member is plate glass.

4. The optical fiber termination structure, according to claim 1, wherein the light transmissive member is bonded to an end face of the hollow-core optical fiber by an adhesive applied or transferred to the light transmissive member or the hollow-core optical fiber.

5. An optical fiber termination structure comprising:
a hollow-core optical fiber that includes a hollow portion through which light is transmitted;
a light transmissive member that covers the hollow portion; and
an antireflection mechanism that prevents reflection of the light passing through the light transmissive member, wherein
the light transmissive member is bonded to an end face of the hollow-core optical fiber by an adhesive applied or transferred to the light transmissive member or the hollow-core optical fiber, and
an outer diameter of the light transmissive member is smaller than a diameter of a through-hole of a ferrule into which the hollow-core optical fiber is inserted.

6. The optical fiber termination structure, according to claim 1, wherein the light transmissive member is bonded to an end face of a ferrule into which the hollow-core optical fiber is inserted, and
the optical fiber termination structure comprises a spacer that surrounds the light transmissive member.

7. The optical fiber termination structure, according to claim 6, wherein a thickness of the spacer is greater than a thickness of the light transmissive member.

8. The optical fiber termination structure, according to claim 1, wherein a normal direction of an end face of the hollow-core optical fiber is inclined at a predetermined angle with respect to an axial direction of the hollow-core optical fiber.

9. The optical fiber termination structure, according to claim 1, wherein a normal direction of the flat portion of the dent is inclined at a predetermined angle with respect to an axial direction of the ferrule.

10. The optical fiber termination structure, according to claim 5, wherein the light transmissive member is arranged while being retracted from an end face of the ferrule.

11. The optical fiber termination structure, according to claim 6, wherein the end face of the ferrule is inclined at a predetermined angle with respect to an axial direction of the ferrule.

12. An optical connection component configured to connect a first optical fiber termination structure and a second optical fiber termination structure, which are the optical fiber termination structure according to claim 1, wherein the light transmissive member of the first optical fiber termination structure and the light transmissive member of the second optical fiber termination structure face each other.

13. An optical connection component configured to connect a first optical fiber termination structure, which is the optical fiber termination structure according to claim 6, and a second optical fiber termination structure not including the spacer, wherein
the spacer of the first optical fiber termination structure is more than twice as thick as the light transmissive member, and
the light transmissive member of the first optical fiber termination structure faces a A light transmissive member of the second optical fiber termination structure.

14. An optical connection component configured to connect a first optical fiber termination structure and a second optical fiber termination structure, which are the optical fiber termination structure according to claim 8, wherein an inclination apex portion of the light transmissive member included in the first optical fiber termination structure and an inclination apex portion of the light transmissive member included in the second optical fiber termination structure face each other.

15. The optical fiber termination structure, according to claim 9, wherein the light transmissive member is arranged while being retracted from an end face of the ferrule.

16. An optical connection component configured to connect a first optical fiber termination structure and a second optical fiber termination structure, which are the optical fiber termination structure according to claim 9, wherein the light transmissive member of the first optical fiber termination structure and the light transmissive member of the second optical fiber termination structure face each other.

17. An optical connection component configured to connect a first optical fiber termination structure and a second optical fiber termination structure, which are an optical fiber termination structure comprising:
   a hollow-core optical fiber that includes a hollow portion through which light is transmitted;
   a light transmissive member that covers the hollow portion; and
   a dent to store the light transmissive member at an end face of a ferrule into which the hollow-core optical fiber is inserted, wherein
   the light transmissive member is bonded to a flat portion of the dent,
   a normal direction of the flat portion of the dent is inclined at a predetermined angle with respect to an axial direction of the ferrule, and
   an inclination apex portion of the light transmissive member included in the first optical fiber termination structure and an inclination apex portion of the light transmissive member included in the second optical fiber termination structure face each other.

18. An optical connection component configured to connect a first optical fiber termination structure and a second optical fiber termination structure, which are the optical fiber termination structure according to claim 5, wherein the light transmissive member of the first optical fiber termination structure and the light transmissive member of the second optical fiber termination structure face each other.

19. The optical connection component, according to claim 17, wherein a thickness of the light transmissive member is 100 μm or smaller.

* * * * *